United States Patent [19]

Aberle et al.

[11] 4,171,911

[45] Oct. 23, 1979

[54] RADIOMETER

[75] Inventors: Claus Aberle, Mannheim; James F. Ruger, Hoffenheim; Klaus-Peter Schulz, Heidelberg, all of Fed. Rep. of Germany

[73] Assignee: Eltro GmbH Gesellschaft fur Strahlungstechnik, Heidelberg, Fed. Rep. of Germany

[21] Appl. No.: 827,781

[22] Filed: Aug. 25, 1977

[30] Foreign Application Priority Data

Sep. 2, 1976 [DE] Fed. Rep. of Germany ....... 2639539

[51] Int. Cl.$^2$ ............................ G01J 1/56; H01J 3/14
[52] U.S. Cl. .................................... 356/216; 250/234
[58] Field of Search ........... 250/234, 235, 236, 203 R; 356/216, 222; 350/6.8, 6.7

[56] References Cited

U.S. PATENT DOCUMENTS

| | | | |
|---|---|---|---|
| 2,858,453 | 10/1958 | Harris | 356/222 X |
| 3,353,022 | 11/1967 | Schwartz | 250/203 R |
| 3,992,619 | 11/1976 | Van Buskirk | 250/234 X |

OTHER PUBLICATIONS

W. E. Shenk et al., "ATS-6 The Geosynchronous Very High Resolution Radiometer" IEEE Trans. on Aerospace and Elec. Sys., vol. AES-11, No. 6, 1975, pp. 1095-1102.

*Primary Examiner*—Rolf G. Hille
*Attorney, Agent, or Firm*—Haseltine, Lake & Waters

[57] ABSTRACT

A scanning radiometer in which at least one curved mirror is integral with a drivable optical system. Thermal radiation is directed onto a detector facing the mirror at a distance. An electronic system performs a weighting evaluation corresponding to the position of the detectors, and a threshold value is indicative of the degree of radiation of the observed object shown on a display unit. The optical system together with the detectors is located about axes containing the center of curvature of the curved mirror and is rotatable in steps or continuously. The mirror is, furthermore, shaped in the form of a hollow sphere or a hollow sphere segment. The latter avoids irradiation of detectors by scatter radiation incident via the aperture with boundaries running parallel to the optical axis or with a boundary expanding funnel-like from the entry window towards the mirror. The boundaries are the carrier body regions parallel to the optical axis, and these regions are covered on the inside with a highly absorbent lacquer corresponding to the wavelength range of the incident scatter radiation.

16 Claims, 3 Drawing Figures

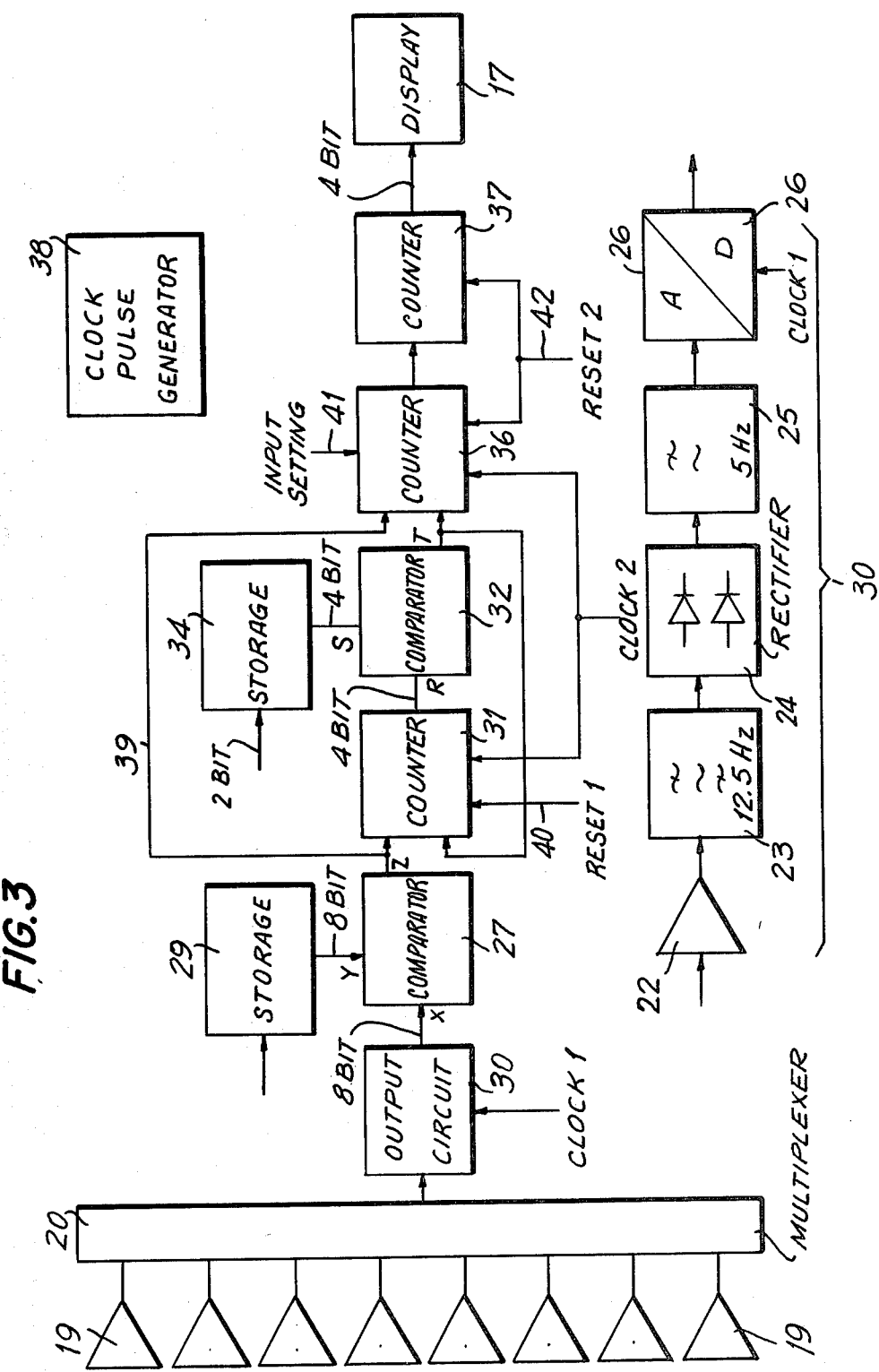

RADIOMETER

BACKGROUND OF THE INVENTION

The present invention relates to a radiometer which scans a background by means of a drivable optical system and at least one curved mirror element integral with this system, and directs thermal radiation to a detector facing it at a distance. It is equipped with an electronic system where a weighting evaluation corresponding to the position of detectors can be performed, and a threshold value makes possible conclusion on the degree of radiation, shown on a display unit, of the observed object.

From German Pat. No. 19 37 639 there is known a coverage degree meter which has the disadvantage that its mirror has large surfaces and is exposed to weather and dirt influences so that it must be equipped with a wiping device which can smear or even scratch the mirror surface. Because of the scanning principle used, long scanning times are required.

Accordingly, it is an object of the present invention to provide an improvement over the conventional equipment by avoiding the above-described disadvantages.

Another object of the present invention is to provide an arrangement of the foregoing character which is substantially simple in construction and may be economically fabricated.

A further object of the present invention is to provide an arrangement, as described, which may be readily maintained in service and which has a substantially long operating life.

SUMMARY OF THE INVENTION

The objects of the present invention are achieved by providing that the optical system, together with the detectors, is located around axes, containing the center of curvature of the main mirror, in steps or continuously rotatable. Based on this simple scanning principle, a relatively high scanning speed can be achieved with a small volume and a low susceptibility to trouble. A beneficial improvement of the invention is provided if the main mirror is shaped like a hollow sphere or hollow sphere segment. In a simple manner, the heat rays, entering through an entry window which is included in the correction of the optical system and is shaped accordingly, strike the mirror and are focused by it on the individual detectors. By the choice of the segment dimensions, and the number and location of the individual detectors, the amount of angle with which the sky is to be resolved can be determined.

To avoid the irradiation of detectors by scatter radiation incident via the aperture, it is of advantage if the hollow-sphere-segment shaped main mirror is provided with boundaries running parallel to the optical axis, or with a boundary expanding funnel-like from the entry window to the mirror. The carrier body regions parallel to the optical axis may be used as such; they are then provided on the inside with a highly absorbing lacquer corresponding to the wavelength range of the incident radiation. When using a funnel-shaped boundary, it may be provided at the inside with a highly absorbing laquer or with lamination-shaped diaphragms running perpendicular to the optical axis.

It is also an advantage when the detectors are fastened on an annular carrier body equipped with a heater and extending on both sides of the detectors, perpendicular to the axis of symmetry; the carrier body is in contact with the end regions of the mirror and surrounds it like a housing. This results in a compact design requiring little space.

An advantageous embodiment of the present invention is that on the outside, in front of the entry window, a modulator disk, which is mirror coated on the side facing the detectors, is provided. The modulator disk modulates the radiation emanating from the background. The mirror coating causes the individual detectors to detect the energy of the background and alternately the reference temperature, so that they deliver a signal proportional to the difference of the two radiations. The detectors may be a cell (strip) tapering from the outer to the inner detectors or may be provided at the outside with a suitable shaped slotted diaphragm (aperture). The aperture is to prevent an overlapping of the individual image fields during the scanning process. It may be mounted on the detectors or at some distance from them. Regarding the individual assemblies of the device, it should be noted that the optical system together with the electronics is combined in one housing, and the latter, with an evaluation electronics system, a power supply, a cleaning device for the entry window and drive units for the modulator disk and the radiometer, are combined in an overall housing. In connection with a safety measure involving the functioning of the device, it is an advantage if the housing containing the optical system and the electronics on its side facing away from the entry window, has a cylindrical base on which the signal and heating cable leading to the interior of the housing are wound. Hence, with scanning motions of the radiometer by ±90°, no bends can occur on the cable so that breakage of the copper cores is impossible. Regarding the electronics of this device, it comprises the scan electronics inside the housing; this electronics comprises the detector cell and the preamplifiers associated with individual detectors, which on the other end are connected to a multiplexer. There also is the evaluation electronics, which, following the signal arriving from the multiplexer, comprises a series circuit and a first comparator which compares a signal fed to it from a first storage, and a first counter, counting beat or timing pulses, and a second comparator which compares a magnitude of the first counter with the magnitude coming from a second storage and permits passage of a number of beat or timing pulses corresponding to this weighting to a second counter; the latter permitting passage of a number of beat pulses corresponding to the degree of radiation to control another counter actuating the display unit. Expediently, the series circuit, following the signal behavior, comprises a post-amplifier of the multiplexer, a band-pass filter, a rectifier, a filter and an A/D converter. The separate arrangement of the radiometer and evaluation electronics accomplishes that maximum interference distance is present on the transmission line to the evaluation electronics. The signals required for controlling the multiplexer are digital, so that there are no troubles expected from there.

Another improvement of the present invention is that a timing generator delivers a first group of timing pulses to the A/D converter and a second group of timing pulses to the second and third counter. The third counter is fed back to the second counter via a line. In this connection it might be of advantage if the first counter has a reset and the second counter a set input and, together with the third counter, another common reset.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a block schematic of the evaluation electronics according to FIG. 1.

DESCRIPTION OF THE PREFERRED EMBODIMENTS

Figure 1:
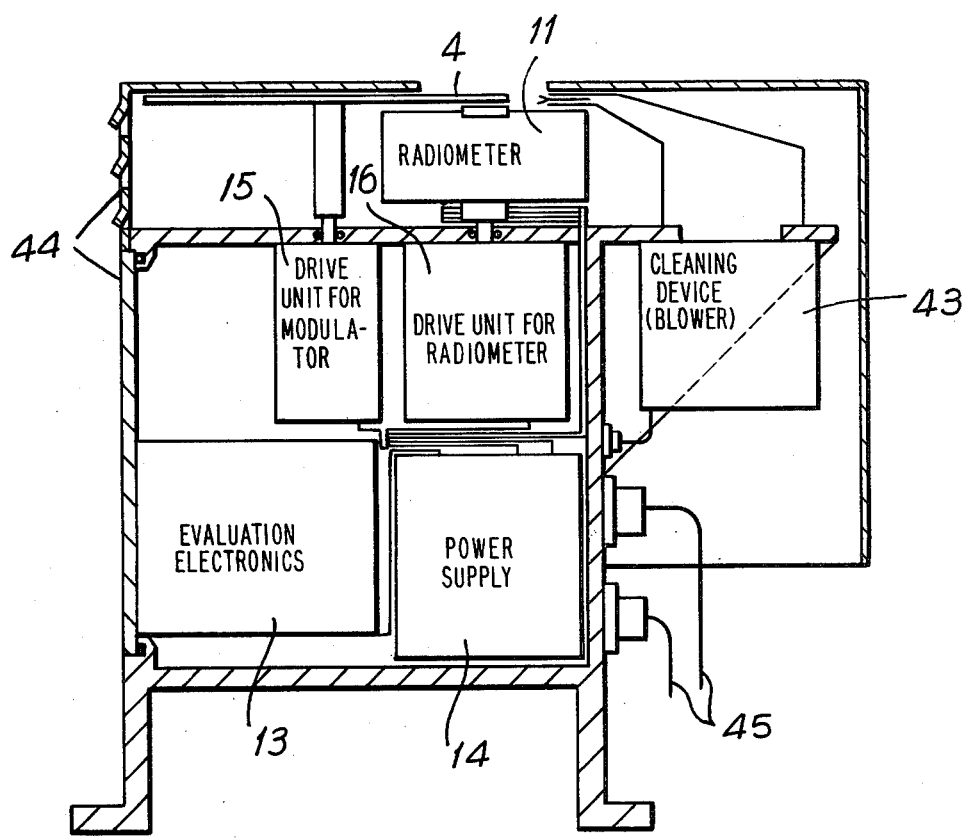
FIG. 1 shows the total housing of a coverage degree meter in section—together with the assemblies included.

The total housing 44 shown in FIG. 1 contains all assemblies of a coverage degree meter—with the exception of the separate display and service unit 17 (FIG. 3) connected via cable 45. This involves—from upper left to bottom righ—the modulator disk 4 and the radiometer 11 and its drive units 15 and 16 directly below, as well as the cleaning device 43 comprising a blower. In the bottom row, is the evaluation electronics 13, the power supply 14 and the step motor control for the radiometer 11. At least the housing portion for the drive units, the evaluation electronics and the power supply should be sealed against moisture.

Figure 2:
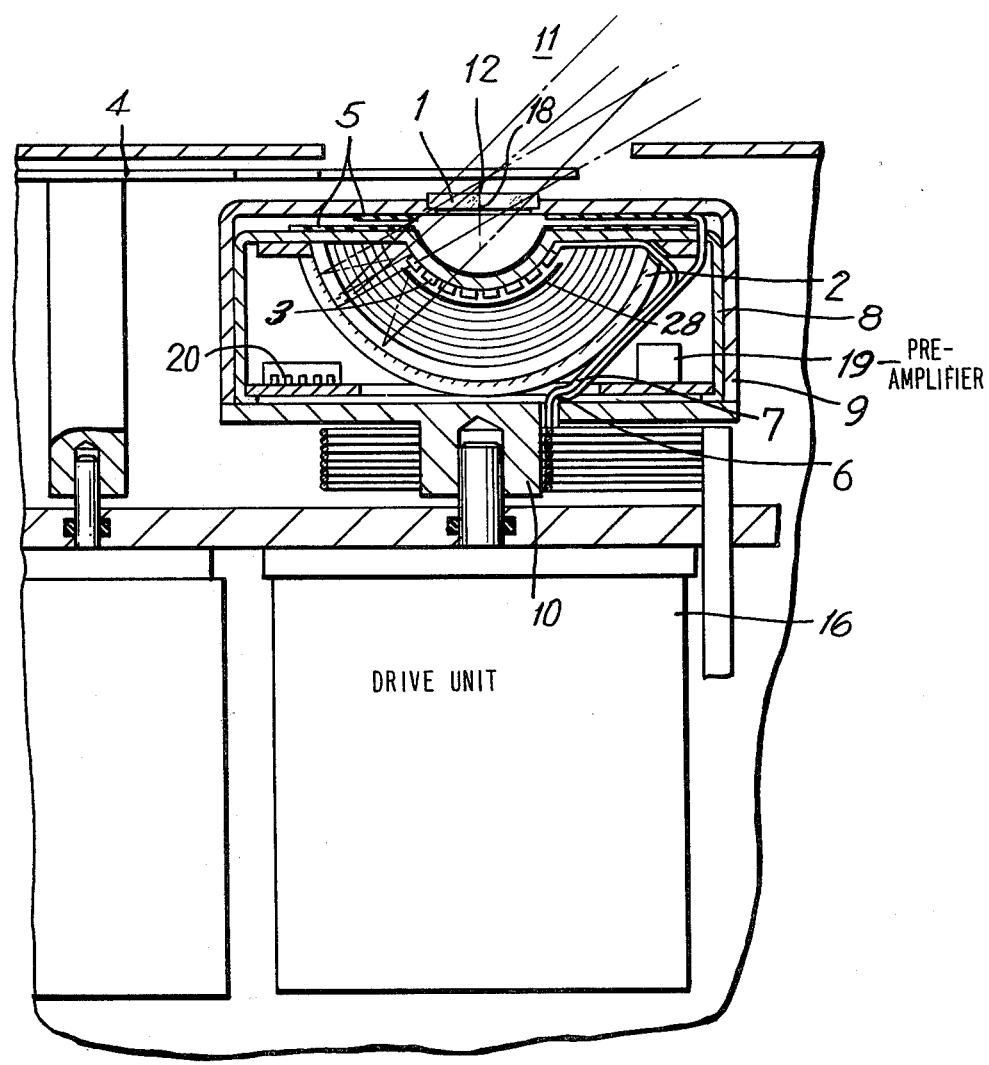
FIG. 2 is an enlarged section of FIG. 1 showing the radiometer with its opto-electronic components.

FIG. 2 shows radiometer 11 with a hollow-sphere shaped mirror 2 with the opening facing the sky; on a circle concentric with the mirror, it is faced by a detector strip 3. The detector strip 3—with other embodiments several detector strips are conceivable—is mounted on a carrier body 8—of metal, for example—which extends into the regions immediately adjacent to the detector strip on both sides perpendicular to the plane of symmetry of the radiometer 11 and surround with these parts, the mirror 2 contacting its narrow ends, like a housing. The dimensions of the mirror are chosen so that, for example, with eight individual detectors and corresponding eight switching steps of the radiometer of 22.5° each the sky is divided into 64 image points and scanned over 360°. The instantaneous sighting angle for eight individual detectors or eight image points and their associate sight angles of 15° each is altogether 120°. In order to prevent overlapping of the individual image fields, there is mounted on the detector strip 3 a slotted aperture 28 whose width decreases from the outer to the inner individual detectors. All these function elements, together with the pre-amplifier 19, associated with each individual detector, and the multiplexer 20 are accommodated in the housing 9 having an entry window 1. A cylindrical base 10 is formed at the housing outside facing away from the window; signal and heating cables 6 and 7 leading into the inside of housing 9 are wound on this base. The signal cable 6 leads to multiplexer 20 and from there via the preamplifiers 19 to detectors 3 while the heating cable 7 leads to the filament heater 5 fastened above the detectors on the carrier body 8 and to the housing 9. Also, the shaft of drive unit 16 associated with radiometer 11 engages at base 10.

Rays which strike mirror 2 through the entry window 1, are mirror 2 through the then reflected onto one of these individual detectors. The rays coming from the background are modulated ahead of the window by means of the modulator disk 4 with 12.5 Hz. The modulator disk 4 on its side facing detector strip 3 is mirror-coated so that the individual detectors, besides the energy of the background, also see the reference temperature. In order to create the important constant temperature conditions, mirror 2 has a highgrade mirror coating and provided with heater 5 by means of which the environment can be kept at 70° C., for example. This temperature range is favorable because this level can be maintained even with intensive solar irradiation without additional cooling.

The evaluation of the electronics 13 located inside the device in accordance with the invention of FIG. 1 and explicitly shown in FIG. 3, is digital. The signal analogous with multiplexer 20 is once more amplified in post-amplifier 22 and then—after filtering out the modulation frequency—rectified by the band pass filter 23 in rectifier 24, filtered in the filter section 25 and delivered to the A/D converter 26. The series circuit 30 including the electronic elements from post-amplifier 22 to the A/D converter is drawn separately in FIG. 3.

The possible scanning time in which the (cloud) coverage degree is indicated can be determined mainly by resonating of the band-pass filter and of the low-pass filter after rectification. The evaluation with the aforementioned 64 image point sources can be made at inervals of about 0.8 seconds so that a new coverage degree is displayed every 52 seconds. After the resonating of the filters, comes the A/D conversion so that an 8-bit word appears at the comparator 27. It accurately reproduces the energy difference seen by the individual detector. The value will be the larger, the colder the cloud under consideration. In comparator 27, signal X fed by A/D converter 26 is compared with signal Y which comes from storage 29 associated with this comparator. Then a logic "1" will always appear at the output Z of comparator 27;

$Z=$"1" for $X<Y$ and for $X=Y$

A logic "0" appears when $Z=0$ for $X<Y$.

If the storage 29 is laid out for several threshold values, statements can be made about the cloud cover at various altitudes. Such thresholds can be pre-set via the operator portion of the display and operating unit 17.

Since the sight angle of the individual detectors is the same, they see (perceive) because of their different inclination with the vertical, at constant cloud altitude, a different size portion of the sky. Thus every image point cannot be assigned the same value (weight) L. If an individual detector indicates a cloud at the edge of the image field, this information should be given a higher value than one located towards the center. For this reason, when the comparator 27 indicates that there is cloud cover with the image field just considered, only so many timing pulses of the timing generator 38 are admitted to counter 26 as corresponds to the weighting of this image. To accomplish this, the timer pulses are counted with counter 31 and compared as signal R in the comparator 32 with the weight S corresponding to this image field from storage 34. Here a 4-bit word appears at comparator 32 and value T at its output. If that value is reached which enters comparator 32 as comparison value (when R=S), counter 36, fed back via a line 39 to the counter 31, need not be actuated via its set input 41. Then the counter 31 is reset via its associate reset 40 in order to be able to count anew for the next YES decision of comparator 27. All timer pulses of the entire image field are continually counted by the counter 36, controlled only by the YES decisions of comparator 27. Assuming that, e.g., with an 8/8 cloud cover 256 pulses are counted, the counter 36 after every 32nd timer pulse will provide a beat or signal for controlling counter 37. With full cloud cover, counter 37 would count to eight. In the display part of the display and operating unit 17, an "8" would show up and remain till a smaller result appears during a renewed total image field scanning. After taking the result into the display portion, counter 31 is reset by means of reset 40 and counters 36 and 37 by means of the reset 42 jointly assigned to both units to the starting point "0", and the counter 36 is set to "16" via its set input 41. Rounding off above and below can be achieved with the "setting". In the present case, the display "⅛" would appear if half of an eighth of cloud cover were present.

It is to be understood that the present invention is neither restricted to the number of detectors, detector strips and switching steps mentioned for the embodiment, nor to certain scan angles, modulation frequencies or time statements. Rather, with other embodiments other values adapted to prevailing conditions are possible without leaving the scope of the invention. Also, with another embodiment it is conceivable that the aperture (diaphragm) does not taper—or at least not by itself—towards its enter region. Instead, the detectors themselves are assembled into a detector strip tapering from the outer to the inner detectors.

Thus, the scanning principle described need not be restricted to cloud coverage degree meters and not even to radiometers. It can be used generally for all optical systems which have a large angle of view.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalents of the following claims.

What is claimed is:

1. A radiometer for scanning a background comprising: an optical drive system; at least one curved mirror element integral with said optical drive system and directing thermal radiation; detectors facing said mirror element at a distance and receiving said thermal radiation; electronic means on said detectors; said optical drive system together with said detectors being mounted stepwise or continuously rotating about axes located in the center of curvature of said curved mirror having the shape of a hollow sphere segment.

2. A radiometer as defined in claim 1 including a display unit for allowing a weighting evaluation corresponding to the position of said detectors and a resulting threshold value indicating the degree of radiation of an observed object on said display unit.

3. A radiometer as defined in claim 2 wherein said segment avoids irradiation of detectors by scatter radiation incident via an aperture with boundaries running parallel to said axes.

4. A radiometer as defined in claim 3 wherein said boundaries comprise regions parallel to said optical axes and being covered on the inside with a substantially highly absorbent lacquer corresponding to the wavelength range of the incident scatter radiation.

5. A radiometer as defined in claim 3 wherein said boundaries are funnel-shaped having a highly absorptive lacquer on the inside corresponding to the wavelength range of the incident scatter radiation.

6. A radiometer as defined in claim 2 wherein said mirror has an entry window and a boundary with a funnel-shaped expansion from said entry window and towards said mirror, a modulator disk having a mirror-coated side facing said detectors and located on the outside in front of said entry window.

7. A radiometer as defined in claim 6 including a first housing for holding said optical system and said electronic means; and a second housing holding said first housing, a power supply, cleaning means for said entry window, and means for driving said modulator disk together with said radiometer.

8. A radiometer as defined in claim 7 including a cylindrical base on said first housing, and signal and heating cables leading to the inside of said housing and wound on said base.

9. A radiometer as defined in claim 7 wherein said electronic means within said first housing comprises detector strip means; preamplifier means connected to said detector strip means; and multiplexer means connected to outputs of said preamplifier means.

10. A radiometer as defined in claim 1 including an entry window through which said thermal radiation strikes said mirror element and is then reflected onto said detectors, said entry window being arranged concentric with said mirror element and restricting entry of said thermal radiation to a predetermined amount, rotation of said radiometer about said center of curvature providing minimum entry area for reducing image errors to minimum, said thermal radiation passing through said entry window symmetrically.

11. A radiometer as defined in claim 1 including an annular carrier body with a heater for mounting said detectors and extending on both sides of said detectors perpendicular to an axis of symmetry, said carrier body being in contact with end regions of said mirror and surrounding said mirror in the form of a housing.

12. A radiometer as defined in claim 1 wherein said detectors comprise a strip tapering off from the outside detectors to the inside detectors.

13. A radiometer for scanning a background comprising: an optical drive system; at least one curved mirror element integral with said optical drive system and directing thermal radiation; a detector facing said mirror element at a distance and receiving the directed thermal radiation; electronic means for performing a weighting evaluation corresponding to the position of detectors; a display unit, a threshold value indicating the degree of radiation of the observed object on said display unit; said optical system together with said detectors being located about axes containing the center of curvature of said curved mirror and being rotatable in steps or continuously; said mirror having the shape of at least a segment of a hollow sphere; said mirror having an entry window and a boundary with a funnel-shaped expansion from said entry window and towards said mirror, a modulator disk having a mirror-coated side facing said detectors and located on the outside in front of said entry window; a first housing for holding said optical system and said electronic means; a second housing holding said first housing, a power supply, cleaning means for said entry window; means for driving said modulator disk together with said radiometer; said electronic means within said first housing comprising detector strip means; preamplifier means connected to said detector strip means; multiplexer means connected to outputs of said preamplifier means; an output series circuit connected to the output of said multiplexer means; a first comparator receiving one input from said series circuit; first storage means connected to a second input of said first comparator means; a first counter for counting timing pulses and connected to the output of said first comparator means, said first storage means applying a threshold value to said second input of said first comparator means; second comparator means having one input connected to the output of said first counter; second storage means connected to a second input of said second comparator means, said second comparator means comparing the output of said first counter and the output of said second storage means and passing a number of timing pulses corresponding to the weighting evaluation; a second counter connected to the output of said second comparator and receiving said number of timing pulses corresponding to the weighting evaluation and passing a number of timing pulses corresponding to the degree of radiation; a third counter controlled by said number of timing pulses from the output of said second counter, the output of said second counter being connected to the output of said third counter; display means connected to the output of said third counter.

14. A radiometer as defined in claim 13 wherein said output series circuits comprises a signal amplifier for amplifying the signals at the output of said multiplexer means, a band pass filter connected to the output of said signal amplifier means, rectifier means connected to the output of said band pass filter means, a filter section connected to the output of said rectifier means; and an analog-to-digital converter connected to the output of said filter section.

15. A radiometer as defined in claim 14 including clock pulse generator means for applying a first group of timing pulses to said analog-to-digital converter, and a second group of timing pulses to said second and third counters, and means for connecting the output of said third counter to the input of said second counter for feeding back the output of said third counter to said second counter.

16. A radiometer as defined in claim 15 wherein said first counter has reset means and said second counter has input setting means, said second counter and said third counter having auxiliary common reset means.

* * * * *